Feb. 4, 1930.      C. C. POUPLIER      1,745,450
LEAF SPRING
Filed Jan. 15, 1927
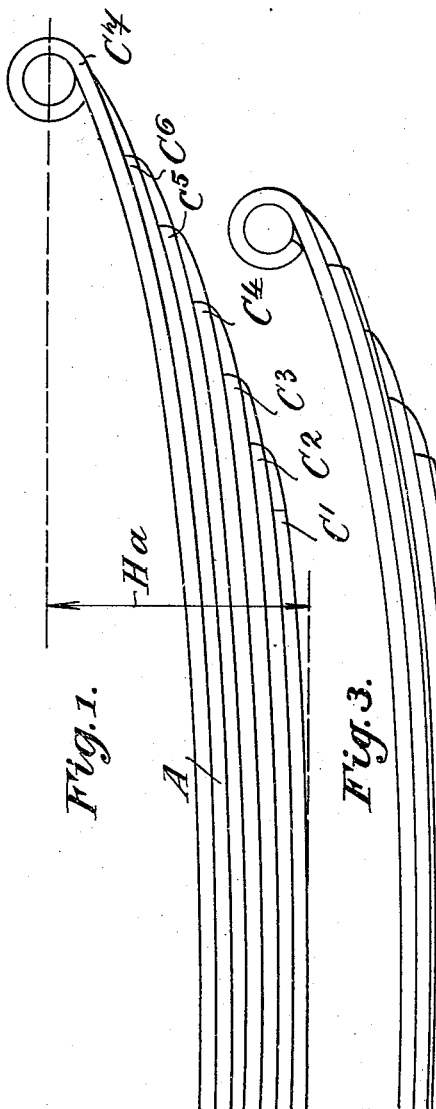
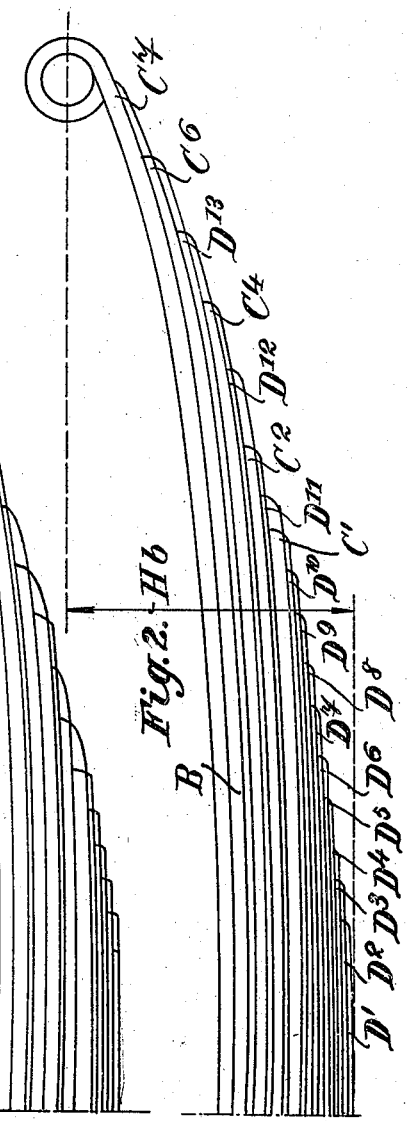

Patented Feb. 4, 1930

1,745,450

UNITED STATES PATENT OFFICE

CARL CASPAR POUPLIER, OF HAGEN, GERMANY

LEAF SPRING

Application filed January 15, 1927, Serial No. 161,371, and in Germany June 12, 1926.

The well-known types of leaf springs which consist of superposed leaves or laminations and are used for the springing of vehicles (power driven vehicles, railway vehicles and the like) owe their shape substantially to the requirements of space. Instead of using a leaf of great width, the leaf has been divided into strips and these strips have been placed in layers one on the other. In such leaf springs substantially the following conditions have been fulfilled:

(1) That it shall form as far as possible a body offering a uniform resistance to bending and (2) that, when bent, it shall not gape (the elastic line must be an arc of a circle). In taking up jolts, besides the springing action determined by the resisting properties of the leaves of the spring there are friction phenomena which were not taken into account in the theoretical considerations regarding the construction of leaf springs. The abutting surfaces of two adjacent leaves in a leaf spring are differently stressed when bent, one leaf representing the outermost zone of the tension stressed half of the leaf spring and the other the outermost zone of the compression stressed half. It follows from this that in taking up jolts there is a sliding friction between the separate leaves, which acts as it were as a shock absorber.

The invention consists in this, that in a leaf spring of an ordinary type, a laminated triangular spring, a laminated rectangular spring, a laminated trapezoidal spring or the like, in place of a portion of the leaves of the spring, which are of substantially the same thickness, and additionally thereto leaves of less thickness are provided, such that the carrying capacity of the leaf spring is not altered.

It has already been proposed to improve the properties of leaf springs by the interposition of intermediate layers. One suggestion has been, to provide intermediate layers of aluminium for preventing adjacent leaves from adhering to one another, which is caused by corrosion due to moist weather or splashes of water when the vehicle is being cleaned. According to another suggestion intermediate layers of soft metal or other non-elastic materials having a very low elastic limit are provided for increasing the friction between the separate layers.

In both cases no intermediate layers having good elastic properties are used, which take into account the conditions above referred to of the elastic line and the preservation of the bearing power. On being stressed, the original cohesion of the separate leaves is suspended, as the formation of the elastic line is not uniform owing to the different strengths of the different materials forming the separate layers, the leaf spring will gape and, as the permanent deformation of the intermediate layers is considerable, in contra-distinction to the supporting springs proper, the gaping will increase more and more in the course of time. The advantage of an increase in friction, expressly aimed at in the second case, is therefore not realized, as after some time the adjacent layers will be in contact only over a small part of their length.

By the use of resilient intermediate layers these disadvantages are overcome. The sliding friction is always fully maintained and produces the required damping action and the bearing power is also in no way reduced, even as compared with the bearing power of ordinary leaf springs. In this way the sliding surfaces producing the damping friction are considerably increased in number, and consequntly the power of absorbing shocks and the elasticity are considerably improved. Shock absorbers or similar auxiliary means of suspension are completely equalled as regards their effect by the leaf spring according to the present invention, and even surpassed, so that, when such a leaf spring is used, they may be entirely done away with. According to the invention the leaves are so arranged that a leaf of normal thickness is succeeded by a leaf of less thickness and the additional leaves of less thickness form the last part of the spring at the top or the bottom. Any material having good resilient properties may be used as the material for thin leaves. Steel bands which have been cold rolled and subsequently hardened have proved particularly suitable for this purpose.

In the accompanying drawings Figure 2 represents a constructional form of leaf spring according to the present invention, which has proved particularly suitable and Figure 1 shows a leaf spring of the usual kind.

Figure 3 shows a modified constructional form of a leaf spring according to the invention.

The leaf spring shown in Fig. 1 is composed of seven superposed leaves $C^1$ to $C^7$. The top leaf $C^7$ is made thicker than the others in the usual manner, as the top spring has to take up tensile and transverse stresses as well as bending stresses. As will be seen from the leaf spring B shown in Fig. 2, the leaf $C^5$ is omitted and is replaced by a thinner leaf $D^{13}$. In the same way $C^3$ is replaced by $D^{12}$. In the example shown the leaf $D^{11}$ is interposed between $C^1$ and $C^2$, the leaf $C^1$ being shaped somewhat differently at the point. The spring is completed at the bottom by the leaves $D^1$ to $D^{10}$, which just as the other interposed thin leaves have the same form as the leaves of normal thickness. The number of thin leaves is determined by the condition already referred to, for obtaining the same bearing power as the leaf spring of ordinary construction. Consequently the height $H^b$ of the leaf spring B is greater than the height $H^a$ of the leaf spring A.

It is not necessary for the thinner leaves to be arranged in the manner shown in Figure 2. Thus for instance it is not necessary to interpose between each two successive leaves of normal thickness a leaf of less thickness, but the object of the invention will also be attained, if the thinner leaf is interposed after every second successive leaf of normal thickness as shown in Figure 3. Other combinations will readily suggest themselves. The essential feature is for the number of sliding surfaces to be increased, in order to obtain the described favourable effect due to the increase in friction consequent thereon.

What I claim is:—

1. A leaf spring comprising in combination a plurality of spring leaves of approximately equal thickness and a plurality of spring leaves of less thickness and having a portion of the spring leaves of less thickness interposed singly between each two spring leaves of greater thickness and the remainder of the spring leaves of less thickness located at one side of the leaf spring, as and for the purpose set forth.

2. A leaf spring comprising in combination a plurality of spring leaves of approximately equal thickness and a plurality of spring leaves of less thickness, made of steel bands which have been cold rolled and subsequently hardened, having a portion of the spring leaves of less thickness interposed singly between each two spring leaves of greater thickness and the remainder of the spring leaves of less thickness located at one side of the leaf spring as and for the purpose set forth.

In testimony whereof I have signed my name to this specification.

CARL CASPAR POUPLIER.